United States Patent [19]

Miller

[11] Patent Number: 5,180,310

[45] Date of Patent: Jan. 19, 1993

[54] AUTOMOTIVE JUMPER CABLE APPARATUS

[76] Inventor: Clifford J. Miller, P.O. Drawer BBB, Kinder, La. 70648

[21] Appl. No.: 779,326

[22] Filed: Oct. 18, 1991

[51] Int. Cl.⁵ .............................................. H01R 33/00
[52] U.S. Cl. ................................ 439/34; 439/490; 439/503
[58] Field of Search .................. 320/25, 26; 439/754, 439/755, 489, 490, 502–506, 34, 620

[56] References Cited

U.S. PATENT DOCUMENTS

| 3,270,267 | 8/1966 | Nolte, Jr. | 439/34 |
|---|---|---|---|
| 3,651,444 | 3/1972 | Desso et al. | 439/680 |
| 4,079,304 | 3/1978 | Brandenburg | 439/34 |
| 4,157,492 | 6/1979 | Colbrese | 320/25 |
| 4,403,824 | 9/1983 | Scott | 439/680 |
| 4,829,223 | 5/1989 | Broberg et al. | 320/25 |
| 4,885,524 | 12/1989 | Wilburn | 439/503 |
| 4,904,205 | 2/1990 | Rice | 439/34 |

Primary Examiner—David L. Pirlot
Attorney, Agent, or Firm—Leon Gilden

[57] ABSTRACT

A mounting block is arranged for securement within an automotive environment in electrical communication with a vehicular battery. A connector block is received within the mounting block to effect electrical communication between a plurality of connector cables relative to the battery wires associated to the battery. Registration structure such as a rib and the like is arranged for securement of the assemblage in a unitary configuration.

3 Claims, 4 Drawing Sheets

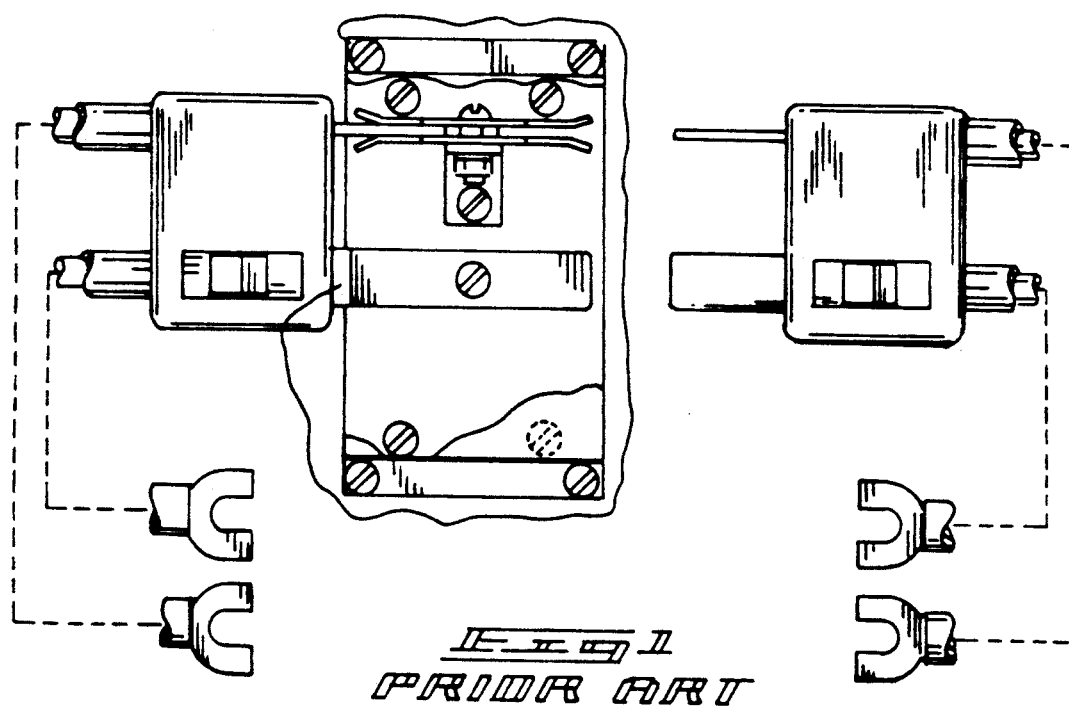
Fig 1
PRIOR ART
Fig 2
PRIOR ART
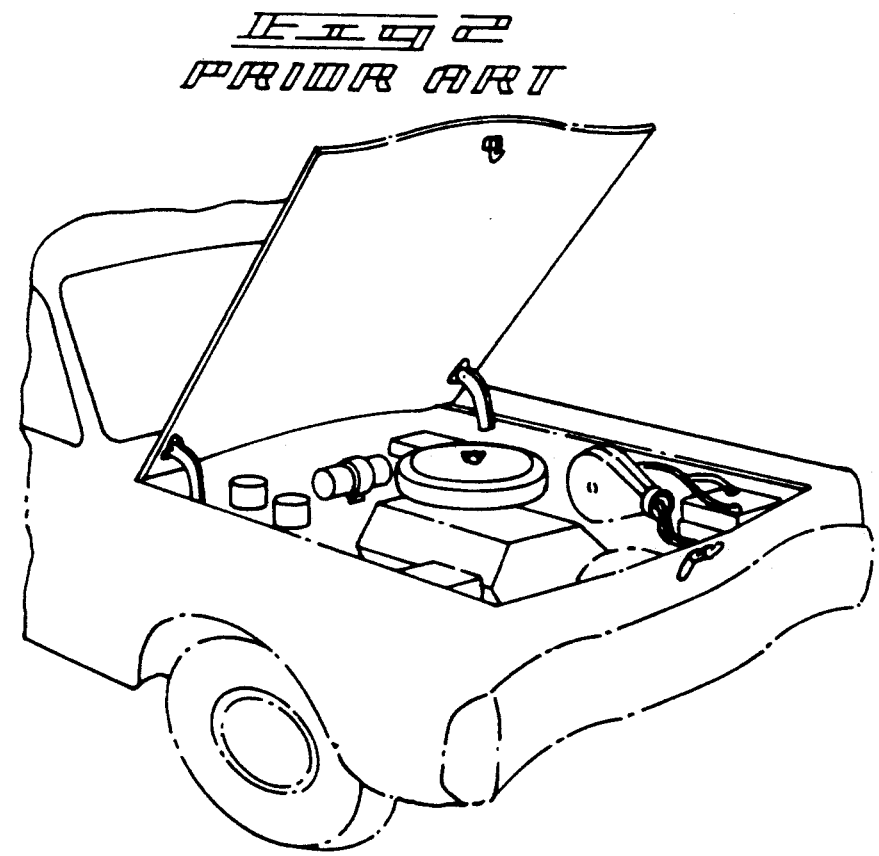

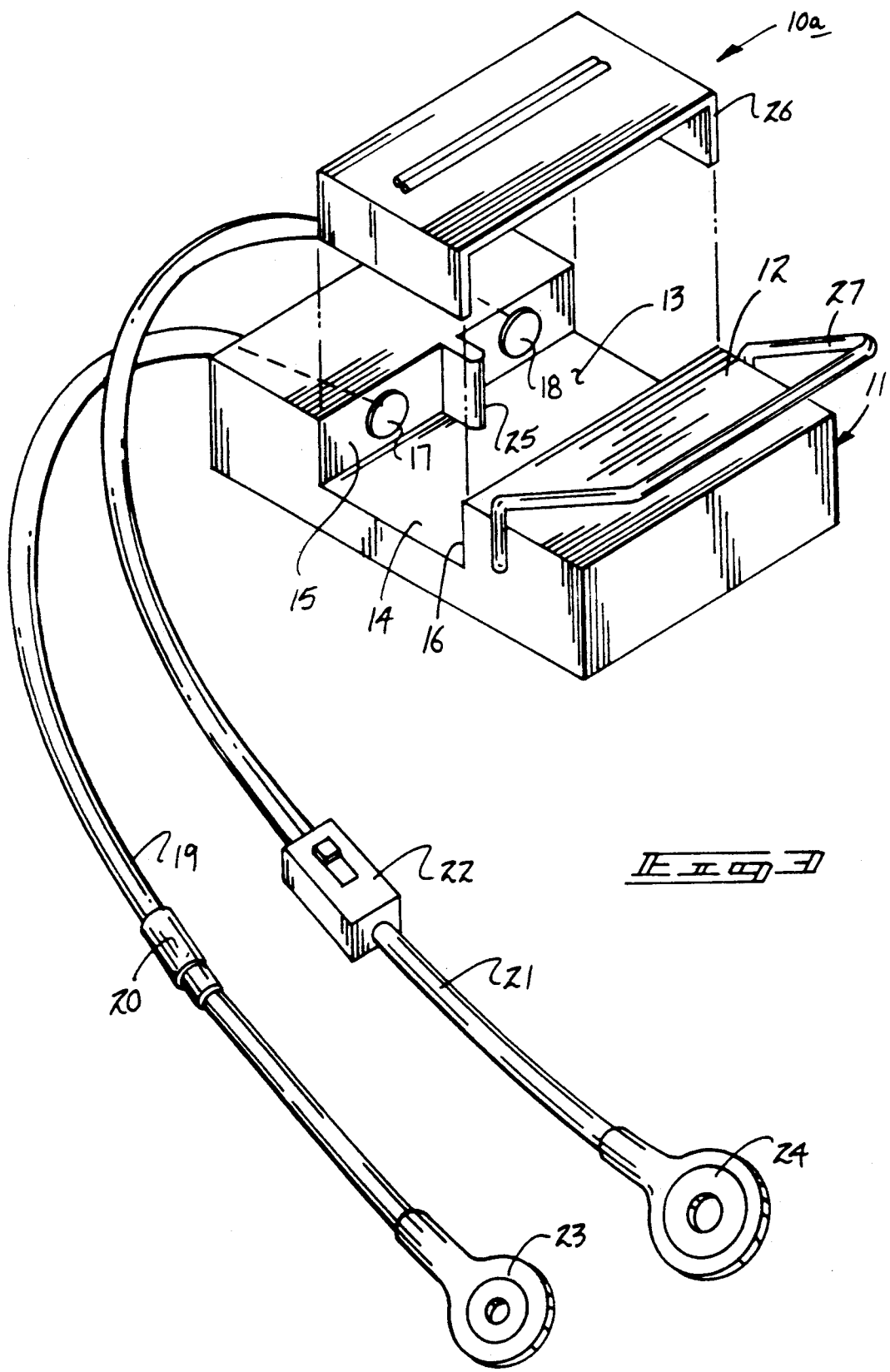

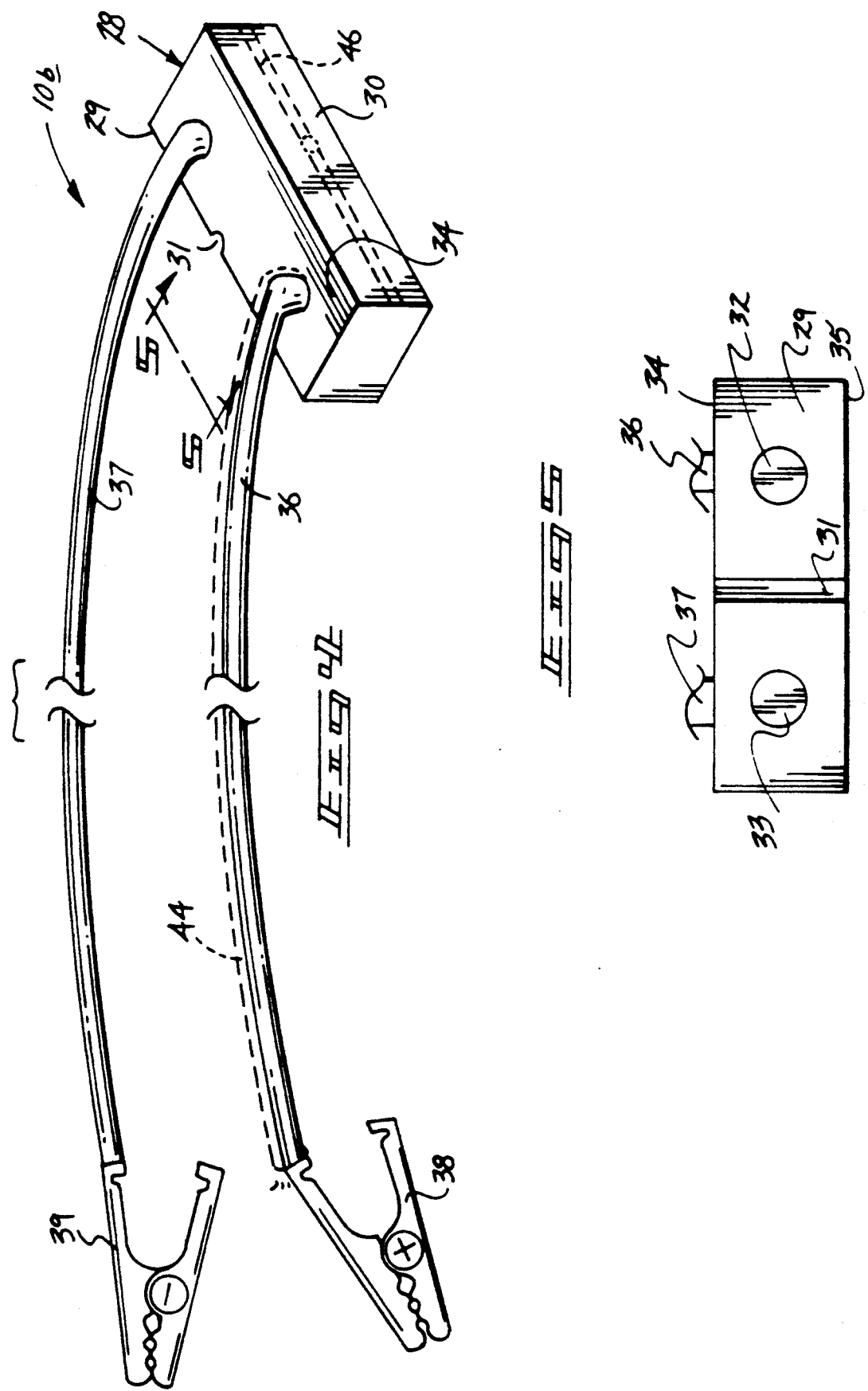

AUTOMOTIVE JUMPER CABLE APPARATUS

BACKGROUND OF THE INVENTION

1. Field of the Invention

The field of invention relates to jumper cable apparatus, and more particularly pertains to a new and improved automotive jump cable apparatus wherein the same is arranged to provide selective securement of a connector block within the mounting block to provide for convenient access to a vehicular battery for access of battery current in a jumper cable procedure.

2. Description of the Prior Art

Jumper cable structure of various types is utilized in the prior art to permit the use of auxiliary battery power requiring the starting or assisting of a first vehicle by a second vehicle. Prior art utilization of such structure has been cumbersome in the connection of jumper cables utilizing clamp structure at both ends thereof. The instant invention attempts to overcome deficiencies of the prior art by providing a receiving block to immediately receive the jumper cable structure in an assembled configuration. Prior art structure is exemplified in U.S. Pat. No. 4,904,205 to Rice wherein retractable jumper cables are mounted within a spool contained within the engine compartment of an associated vehicle.

U.S. Pat. No. 4,653,833 to Czubernat, et al. sets forth a further example of retractable booster cables or jumper cables mounted within an associated support housing.

As such, it may be appreciated that there continues to be a need for a new and improved automotive jumper cable apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of jumper cable apparatus now present in the prior art, the present invention provides an automotive jumper cable apparatus wherein the same is arranged to provide a mounting block receiving a connector block in a complementary manner to effect electrical communication between jumper cables and an associated vehicular battery. As such, the general purpose of the present invention, which will be described subsequently in greater detail, is to provide a new and improved automotive jumper cable apparatus which has all the advantages of the prior art jumper cable apparatus and none of the disadvantages.

To attain this, the present invention provides a mounting block arranged for securement within an automotive environment in electrical communication with a vehicular battery. A connector block is received within the mounting block to effect electrical communication between a plurality of connector cables relative to the battery wires associated to the battery. Registration structure such as a rib and the like is arranged for securement of the assemblage in a unitary configuration.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automotive jumper cable apparatus which has all the advantages of the prior art jumper cable apparatus and none of the disadvantages.

It is another object of the present invention to provide a new and improved automotive jumper cable apparatus which may be easily and efficiently manufactured and marketed.

It is a further object of the present invention to provide a new and improved automotive jumper cable apparatus which is of a durable and reliable construction.

An even further object of the present invention is to provide a new and improved automotive jumper cable apparatus which is susceptible of a low cost of manufacture with regard to both materials and labor, and which accordingly is then susceptible of low prices of sale to the consuming public, thereby making such automotive jumper cable apparatus economically available to the buying public.

Still yet another object of the present invention is to provide a new and improved automotive jumper cable apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view of a prior art jumper cable interconnection cable for use in an under hood arrangement.

FIG. 2 is an isometric illustration of a prior art jumper cable apparatus, as set forth in U.S. Pat. No. 4,904,205.

FIG. 3 is an isometric illustration of the mounting block utilized by the invention.

FIG. 4 is an isometric illustration of the jumper cable connector block utilized by the invention.

FIG. 5 is an orthographic view, taken along the lines 5—5 FIG. 4 in the direction indicated by the arrows.

DESCRIPTION OF THE PREFERRED EMBODIMENT

Figure 6:
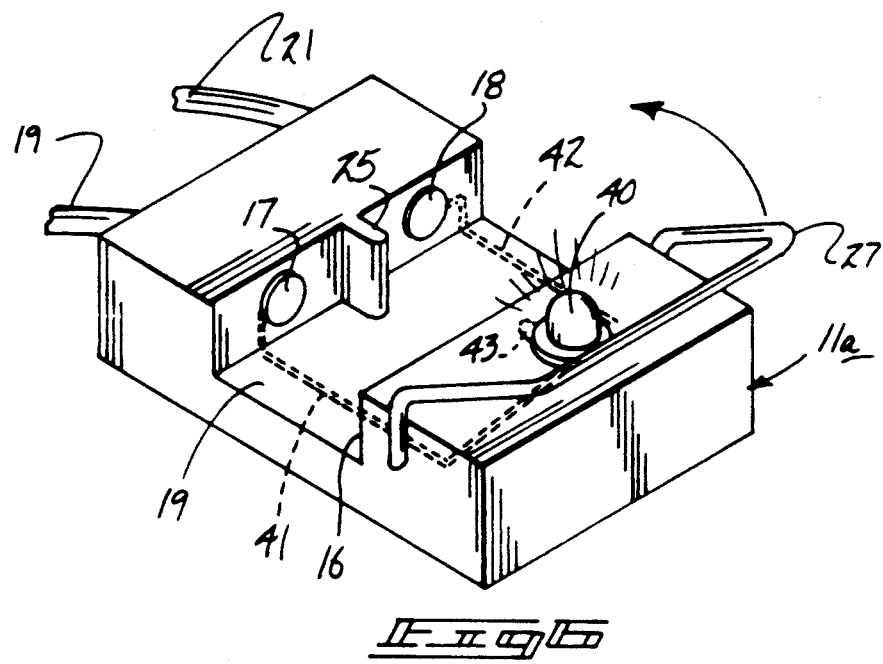
FIG. 6 is an isometric illustration of a modified mounting block utilized by the invention.
Figure 7:
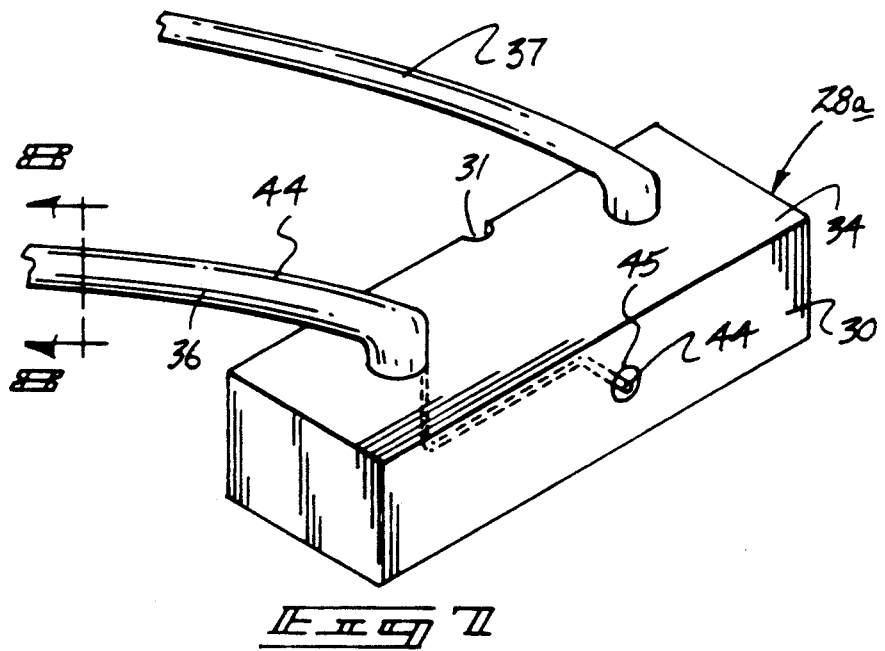
FIG. 7 is an isometric illustration of a modified connector block utilized by the invention.
Figure 8:
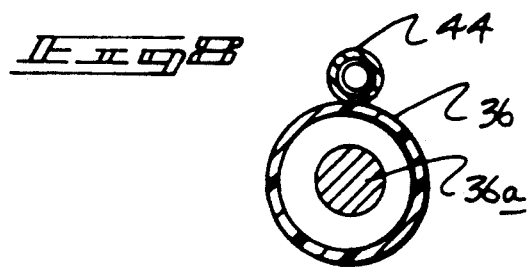
FIG. 8 is an orthographic view, taken along the lines 8—8 of FIG. 7 in the direction indicated by the arrows.

With reference now to the drawings, and in particular to FIGS. 1 to 8 thereof, a new and improved automotive jumper cable apparatus embodying the principles and concepts of the present invention and generally designated by the reference numeral 10 will be described.

FIG. 1 illustrates electrical communication utilizing switch circuits of a jumper cable apparatus, as set forth in U.S. Pat. No. 4,904,205 in mounting the associated structure within an under hood situation for use by an automotive vehicle, as set forth in U.S. Pat. No. 4,157,492.

U.S. Pat. No. 4,904,205 sets forth a retractable jumper cable housing arranged for selective extension relative to an associated vehicle for use in a jumper cable situation.

More specifically, the automotive jumper cable apparatues 10 of the instant invention essentially comprises a mounting block 11 arranged in vehicular mounting, such as within the engine compartment of the vehicle, formed with a mounting block top wall formed with a top wall recess 13 projecting into the block through the top wall. The recess includes a recess floor defined by a predetermined length, including a recess front wall spaced from a recess rear wall spaced apart a predetermined width, where the walls are defined by a predetermined height. A first electrical contact plate 17 and a second electrical contact plate 18 are mounted to the front wall 15 and are in electrical communication with respective first and second battery wires 19 and 21. The first battery wire 19 includes an in-line fuse 20 of sufficient amperage to accommodate predetermined electrical spikes within the first battery wire 19. The second battery wire 21 includes a switch 22 of a two-way configuration to effect the selective opening or closing of electrical communication within the second wire 21, as required. A first terminal 23 and a second terminal 24 are arranged for mounting the respective first and second battery wires 19 and 21 to a respective battery (not shown). Such a battery is illustrated within an engine compartment as depicted in the FIG. 2 of the prior art as such batteries are notoriously a well known configuration in utilization within an automotive environment.

The recess front wall 15 includes a front wall rib 25 extending orthogonally relative to the front wall and extending between the floor 13 and the top wall 12. The organization further includes a "U" shaped spring biased locking bale 27 biased into a normally downward orientation within the recess 13, wherein a "U" shaped cover plate 26 may be positioned to overlie the recess 13 in use with the bale 27 arranged to impart securement of the cover plate relative to the mounting block 11.

A connector block 28, as illustrated in FIG. 4, is utilized and mounted within the recess 13. The mounting block 13 is typically of a complementary configuration to the recess 13, but may be in fact of a narrower width if desired and if such is the case, an elongate slot 46 is directed coextensively along the connector block rear wall 30 for engagement with the bale 27. In this manner, the respective first and second electrical contact plates 17 and 18 are arranged with a lip (not shown) at an upper end thereof to secure and prevent upward movement of the connector block 28 when a respective third and fourth electrical contact plate 32 and 33 mounted upon the connector block front wall 29 is positioned in juxtaposition to the first and second electrical contact plate 17 and 18.

Typically, the third and fourth electrical contact plates 32 and 33 are coaxially aligned with the first and second contact plates17 and 18 for enhanced electrical communication, wherein the connector block front wall 29 and connector block rear wall 30 are spaced apart the predetermined width defined by the recess 13, and wherein the connector block is a predetermined length and of a predetermined height defined by the recess 13 defined by the connector block top wall 34 spaced from the connector block bottom wall 35 defined by the predetermined height, wherein each top wall and bottom wall are defined by the predetermined length. In this manner, a recess 31 is medially positioned within the front wall 29 orthogonally oriented between the top wall 34 and the bottom wall 35 to complementarily receive the front wall rib 25 therewithin to align and secure the connector block 28 within the recess 13 of the mounting block 11. A respective first and second connector cable 36 and 37 are in electrical communication with the respective third and fourth contact plates 32 and 33, with a respective first and second spring clamp 38 and 39 mounted at a distal end of each cable. Each of the first and second spring clamps 38 and 39 include respective first and second biased jaws 38 and 39 that utilize spring biased connections at each hinge of each clamp to bias the jaws in a closed configuration, as illustrated in FIG. 4.

The modified mounting block 11a, as illustrated in FIG. 6, includes an illumination indicator bulb 40 projecting through the top wall 27 in operative association with a respective first and second contact plate wire 41 and 42 in electrical communication with respective first and second electrical contact plates 17 and 18, wherein upon actuation of the switch 22 to a closed configuration to permit electrical flow through the first and second battery wires 19 and 21, indication of such active current directed to the first and second electrical contact plates 17 and 18 is effected and permitting observation of such condition. The illumination bulb 40 is in operative communication with an illumination cavity 43 directed into the bulb to direct illumination therethrough to impart illumination to a rear distal end of a fiber optic cable 44 positioned within a fiber optic cable opening 45 through the connector block rear wall 30. Illumination is thereby directed through the associated fiber optic cable and as illustrated in phantom in FIG. 4, terminates at the forward distal end of the first connector cable 36, typically of a positive connection, wherein connection of this battery cable is typically more critical than the negative cable or the second connector cable 37 and thereby illumination is directed from the fiber optic cable 44 terminating at a forward distal end of the first connector cable 36 to provide required illumination, particularly in conditions of limited light availability.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is cliamed as being new and desired to be protected by Letters Patent of the United States is as follows:

1. An automotive jumper cable apparatus, comprising,
   - a mounting block arranged for securement within a vehicle, wherein the mounting block includes a block top wall defining a recess directed into the mounting block from the top wall, wherein the recess includes a recess floor, a recess front, and a recess rear wall, and the mounting block including spaced mounting block side walls, wherein the recess extends coextensively through the side walls in an orthogonal orientation, and
   - a respective first and second electrical contact plate fixedly mounted within the recess to the front wall, the first electrical contact plate including a first battery wire extending exteriorly of the mounting block in electrical communication with the first contact plate, and
   - a second battery wire extending exteriorly of the mounting block in electrical communication with the second contact plate, the first battery wire including an in-line fuse, and the second battery wire including an on/off switch contained therewithin, and
   - the first battery wire including a first terminal, the second battery wire including a second terminal, and
   - a connector block complementarily received within the recess, the connector block including a third electrical contact plate coaxially aligned with the first electrical contact plate when the connector block is mounted within the recess, and a fourth electrical contact plate mounted to the connector block coaxially aligned with the second contact plate when the connector block is mounted within the recess, and
   - the third electrical contact plate in electrical communication with a first connector cable, and
   - the fourth electrical contact plate in electrical communication with a second connector cable, wherein the first connector cable and the second connector cable extend exteriorly of the connector block, and
   - the connector block includes a front wall and the third electrical contact plate and the fourth electrical contact plate are mounted to the front wall, and the connector block including a rear wall spaced from and parallel the front wall, and the connector block including a connector block top wall spaced from and parallel a connector block bottom wall, the connector block top wall spaced from the connector block bottom wall a predetermined height, and the connector block top wall and the connector block bottom wall defined by a length equal to a predetermined length, wherein the recess front wall and the recess rear wall are defined by a height equal to the predetermined height, and the recess floor is defined by a length equal to the predetermined length, and the connector block front wall includes a connector block recess orthogonally oriented between the top wall and bottom wall extending coextensively between the top wall and the bottom wall directed into the connector block front wall, and the recess front wall including a front wall rib, the front wall rib extending orthogonally relative to the recess floor and the mounting block top wall, wherein the front wall rib is complementarily received within the connector block recess when the connector block is mounted within the recess, and
   - the first connector cable and the second connector cable include a respective first and second spring clamp mounted to the respective first and second connector cable, and
   - a "U" shaped spring biased bale pivotally mounted to the mounting block and biased to extend into the recess to secure the connector block within the recess.

2. An apparatus as set forth in claim 1 wherein the mounting block top wall includes an illumination bulb projecting from within the mounting block extending upwardly beyond the mounting block top wall, and an illumination cavity in communication with the illumination bulb projecting through the recess rear wall, and a fiber optic cable positioned within the mounting block and extending from the connector block rear wall positioned within the opening and contiguously mounted along the first connector cable and extending through the first spring clamp to direct illumination onto the first spring clamp when the connector block is mounted within the recess.

3. An apparatus as set forth in claim 2 wherein the first electrical contact plate includes a first contact plate wire in electrical communication between the first electrical contact plate and the illumination indicator bulb, and the second electrical contact plate including a second contact plate wire in electrical communication with the second contact plate and the illumination indicator bulb to effect illumination of the illumination bulb when the switch is in a closed orientation to direct electrical current through the second battery wire and the fuse effects operative communication between the first electrical contact plate and the first terminal.

* * * * *